May 10, 1938.   D. C. BARDWELL ET AL   2,116,993
PROCESS FOR THE PRODUCTION OF HYDROGEN
Original Filed Sept. 25, 1930
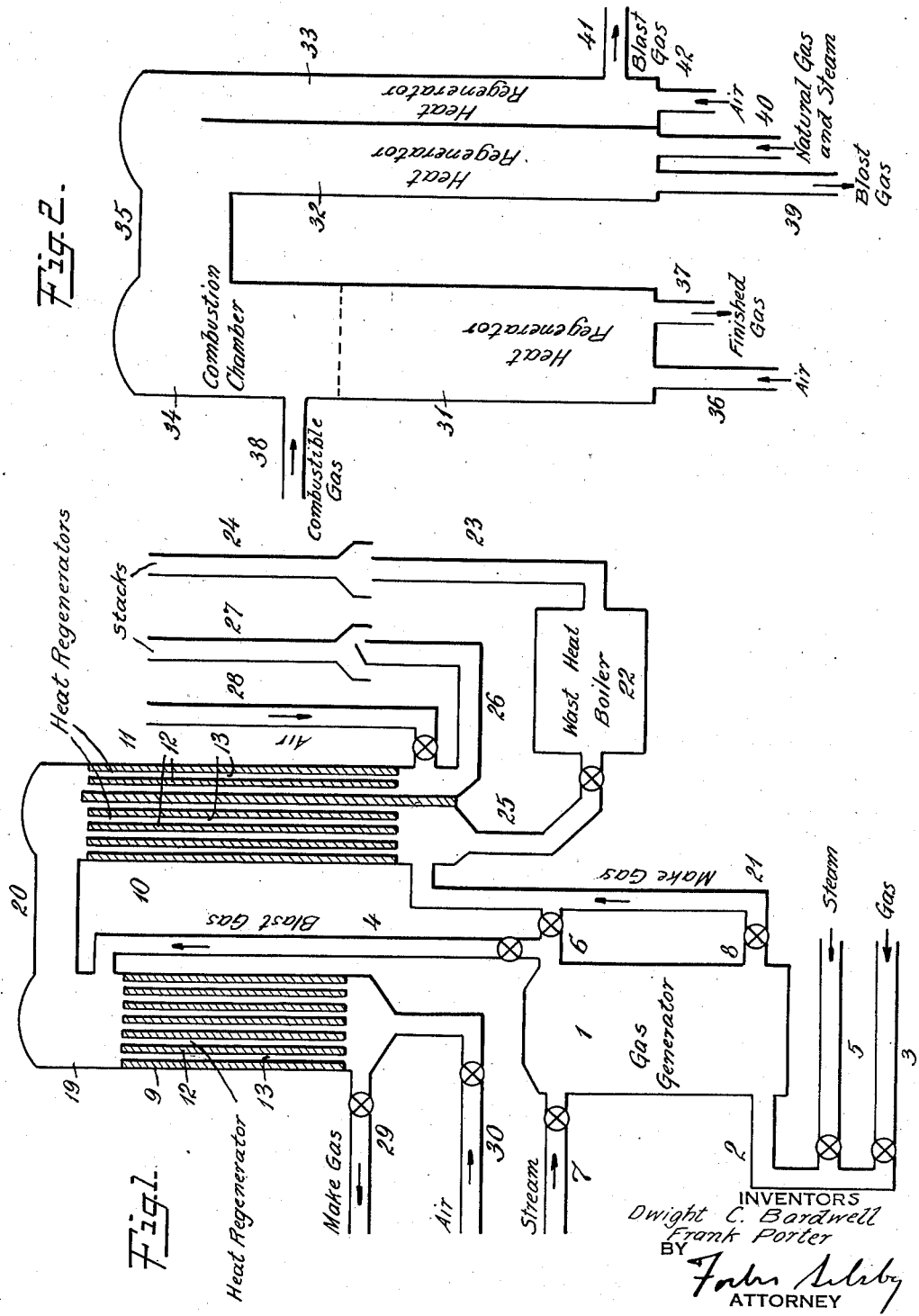

Patented May 10, 1938

2,116,993

UNITED STATES PATENT OFFICE 2,116,993

PROCESS FOR THE PRODUCTION OF HYDROGEN

Dwight C. Bardwell, Syracuse, N. Y., and Frank Porter, Prince George County, Va., assignors, by mesne assignments, to The Solvay Process Company, New York, N. Y., a corporation of New York Original application September 25, 1930, Serial No. 484,268. Divided and this application March 10, 1936, Serial No. 68,040

8 Claims. (Cl. 23—212)

This invention relates to a process and apparatus for the production of a combustible gas substantially free from hydrocarbons from a gas containing hydrocarbons. More particularly, this invention relates to a process for the production of a gas containing hydrogen and nitrogen by the decomposition of the hydrocarbon content of a combustible gas in the presence of air.

It has heretofore been proposed to prepare a gas containing hydrocarbons by treating a heated bed of bituminous fuel with steam and then to pass the resulting gaseous products in contact with heated refractory material to decompose the hydrocarbons. It has also been proposed to decompose a hydrocarbon gas, such as natural gas, by passing it in contact with refractory material previously heated by burning a portion of natural gas in direct contact therewith or to incompletely burn natural gas with air or oxygen in limited amounts to produce a gas containing hydrogen and carbon monoxide with or without nitrogen. The processes heretofore proposed have not been found suitable for the preparation by the reaction of a hydrocarbon gas with steam of a hydrogen gas which is to be employed in industrial processes, such as the synthesis of ammonia, where an exceedingly high degree of purity of the gas is a requisite. In an ammonia synthesis process, for example, where the synthesis gases are passed over a catalyst and after removal of ammonia product, the residual uncombined gases are recirculated in a cyclic system into renewed contact with the catalyst, a content of about 0.5% of hydrocarbon in the hydrogen-nitrogen gas introduced into the synthesis is substantially the upper limit of this impurity which is permissible for economic operation of the process. The gaseous products from the above processes contain residual undecomposed hydrocarbon in an amount which renders them unsatisfactory for use in the synthesis of ammonia therefrom.

It is an object of this invention to provide a process for the thermal decomposition in the presence of steam of the hydrocarbon content of a gas containing the same in which the requisite high temperature for the production of a gas substantially free from hydrocarbon may be attained and maintained in an efficient manner. It is a further object of this invention to provide an efficient process for the production of a hydrogen-nitrogen gas suitable for catalytic synthesis of ammonia therefrom from a gas containing hydrocarbons, such as natural gas or water gas, produced from bituminous fuel. Other objects of the invention will in part be obvious and will in part appear hereinafter.

The processes of this invention, more particularly described hereinafter, for the decomposition of a hydrocarbon gas comprise burning a combustible gas with preheated air in a combustion chamber. Sensible heat contained in the hot products of combustion is recovered and transferred, a portion to a mixture of a hydrocarbon gas and steam and another portion to air to preheat the same by passing the methane and steam and the air vertically upwards through zones of increasing temperature in heat regenerators containing refractory material. The thus heated hydrocarbon-steam mixture, in which a large portion of the hydrocarbon has been decomposed during its passage in contact with the hotter portions of refractory material in the regenerator, and the preheated air are mixed and as a result of incomplete combustion of a portion of the hydrocarbon gas, the mixture is heated to a high temperature of about 1500° C. whereby the hydrocarbon is substantially completely decomposed by means of the steam and oxygen and a gaseous product formed containing nitrogen, hydrogen and carbon monoxide and substantially free from hydrocarbons. The amount of air employed is preferably regulated to produce a gaseous product containing about one volume of nitrogen to every three volumes of hydrogen and carbon monoxide taken together. Sensible heat contained in the hot products of the reaction is recovered by passing them vertically downwards through a zone of decreasing temperature in a heat regenerator containing refractory material and the heat thus recovered is transferred to air which is subsequently employed for burning a combustible gas to produce heat required for the reaction of a subsequent portion of hydrocarbon gas, steam and air. Thus, in the described process, the flow of the gases before, during and after the reaction, takes place substantially wholly in a vertical direction.

For a fuller understanding of the nature and objects of this invention, reference should be had to the following detailed description taken in conjunction with the accompanying drawing.

In the drawing, Fig. 1 illustrates a process for the production of a hydrogen gas from bituminous fuel; and Fig. 2 illustrates a process for the production of a hydrogen gas by the decomposition of a hydrocarbon gas, such as natural gas.

Referring now to Fig. 1 of the drawing, the numeral 1 indicates a water gas generator of well known design provided with a pipe 2 entering the bottom of the generator whereby air from a pipe 3 may be blasted through the bed of fuel and the hot blast gases taken off from the top of the generator through a pipe 4 and in another period of operation steam from the pipe 5 may be introduced into the bottom of the fuel bed and the water gas generated by reaction of the steam in the fuel bed taken off from the top of the generator through a pipe 6. The generator is also provided with a pipe 7 for introducing steam into the top of the generator and pipe 8 for removing the gaseous products from the bottom of the generator. Numerals 9, 10 and 11 indicate three heat regenerators containing a refractory material 12. Refractory material 12 may consist of bricks laid in the regenerators as a checker work. Referring again to Fig. 1, pipe 4 enters regenerator 9 above the packing contained therein. The top portion of this regenerator serves as a combustion chamber 19. A pipe 20 leads from combustion chamber 19 to the tops of regenerators 10 and 11. Pipes 6 and 8 communicate with a pipe 21 which leads to the bottom of regenerator 10. The bottom of regenerator 10 is in communication with waste heat boiler 22, pipe 23, and stack 24 by means of pipe 25. A pipe 26 communicates between the bottom of regenerator 11 and stack 27 and pipe 28 communicates with the bottom of regenerator 11. Pipes 29 and 30 communicate with the bottom of regenerator 9. Valves for controlling the flow of gases in the system are indicated.

In employing the apparatus shown in Fig. 1 for the production of a hydrogen gas substantially free from hydrocarbons from bituminous fuel, such as bituminous coal, a bed of hot fuel in gas generator 1 is blasted by air admitted to the bottom of the fuel bed from pipe 3 through pipe 2 and the hot blast gases passed through pipe 4 into combustion chamber 19. Air from pipe 30 is passed through regenerator 9 which has been previously heated by the hot gases produced by a preceding gas-making operation in the manner described below and any combustible gas in the blast gases from pipe 4 is burned in combustion chamber 19 and the hot products of combustion passed through pipe 20 and are divided and a portion passed through regenerator 10 and another portion passed through regenerator 11 where they give up sensible heat to the refractory material therein and serve to heat the material to a high temperature. The gases from regenerator 10, after being employed in waste heat boiler 22 for the production of steam, are vented through pipe 23 and stack 24 to the atmosphere. The hot gases from regenerator 11 are vented to the atmosphere through pipe 26 and stack 27. When the fuel bed in generator 1 has been heated to a temperature at which it will decompose steam to form water gas, the air blast from pipe 3 is shut off and steam is admitted from pipe 5 through pipe 2 to the bottom of the fuel bed in generator 1 where it is decomposed by means of the highly heated fuel with the production of water gas which is taken off from the top of the generator through pipe 6 and passed through pipe 21 to the bottom of and through regenerator 10 where it is highly heated by extraction of heat from the refractory material. Simultaneously with this gas-making step, an oxygen-containing gas, preferably air from pipe 28, is passed through regenerator 11. The water gas which has been heated in regenerator 10 and contains hydrocarbons, together with water vapor which was undecomposed in its passage through the bed of fuel in generator 1, and the preheated air from generator 11, are mixed in the space above the packing material 12 and in combustion chamber 19, and a portion of the gas from regenerator 10 is burned by means of the oxygen. A combustion temperature of above about 1300° C., and preferably of about 1500° C. is maintained which induces a reaction between the hydrocarbons and steam to form carbon monoxide and hydrogen. The quantity of air employed is limited to an amount which will produce a gas containing about one volume of nitrogen to every three volumes of hydrogen and carbon monoxide. The hot gases from the reaction between the water gas, steam and air pass from combustion chamber 19 through regenerator 9 to pipe 29 whence they are conducted to a gas holder or to treatment in any desired manner for the conversion of their carbon monoxide content to hydrogen and carbon dioxide by means of steam in the presence of a catalyst. As the operation in gas producer 1 continues, the passage of steam upwardly through the fuel bed may be discontinued and steam admitted to the top of the generator from pipe 7 and passed downwardly from the fuel bed and thence through pipes 8 and 21 to regenerator 10 where it is preheated prior to the treatment with preheated air as described. When the temperature of regenerators 10 or 11 falls to a point at which the combustion temperature in chamber 19 is below about 1300° C. and a hydrocarbon-free gas is no longer satisfactorily produced, or when the temperature of the fuel bed in gas producer 1 decreases to a point at which the gas generator is no longer operating efficiently, the introduction of steam to the bed of fuel is discontinued and the fuel bed blasted with air from pipe 3 and the blast gases burned in combustion chamber 19 by means of air from pipe 30 preheated in regenerator 9 in the manner above described.

In carrying out the process above described, it has been found that a nitrogen-hydrogen gas containing one volume of nitrogen to every three volumes of hydrogen and carbon monoxide taken together and substantially free from hydrocarbons may be prepared in a practical economic manner. By suitably preheating the air employed for the combustion of the blast gases by transfer thereto of sensible heat contained in the hydrogen-nitrogen gas from the hydrocarbon decomposition step, it has been found possible to heat the refractory material in regenerators 10 and 11 to a sufficiently high temperature so that by subsequently transferring this high temperature heat to water gas from the gas generator and to air and then mixing the thus preheated gases to induce combustion of a portion of the gas, that a temperature of about 1500° C., which has been found desirable for the complete decomposition of the hydrocarbon, may be readily and efficiently obtained and maintained during the gas producing steps of the intermittently operating process above described.

Fig. 2 is a diagrammatic illustration of a process for the decomposition of natural gas in accordance with this invention. In that figure, 31, 32 and 33 indicate heat regenerators containing refractory packing material corresponding to regenerators 9, 10 and 11 respectively of Fig. 1. The upper part of regenerator 31 above the packing contained therein serves as a combustion chamber 34. A pipe 35 communicates between combustion chamber 34 and the tops of regenerators 32 and 33. A pipe 36 enters the bottom of regenerator 31 and serves for conducting air to this regenerator. A pipe 37 communicating with the bottom of regenerator 31 serves as an exit pipe for the gas produced by the decomposition of the natural gas. A pipe 38 communicates with the bottom of combustion chamber 34 above the packing in regenerator 31. Pipes 39 and 40 communicate with the bottom of regenerator 32 and pipes 41 and 42 communicate with the bottom of regenerator 33.

In employing the apparatus shown in Fig. 2 for the decomposition of natural gas to produce a gas substantially free from hydrocarbons, air from pipe 36 is introduced into regenerator 31 and passed through the refractory material therein which has been previously heated in the manner described below. A combustible gas, which may, for example, be natural gas, is introduced into the bottom of combustion chamber 34 where it is burned by means of the preheated air from regenerator 31 and serves to heat the combustion chamber, and the hot products of combustion pass through pipe 35 and are divided into two portions which are passed through regenerator 32 and pipe 39 and through regenerator 33 and pipe 41 respectively to the atmosphere. By burning the combustible gas in combustion chamber 34 and passing the hot products of combustion through regenerators 32 and 33, the combustion chamber and regenerators are heated to a high temperature. The introduction of air and gas to regenerator 31, and combustion chamber 34 is then discontinued and a mixture of natural gas and steam is introduced into the bottom of regenerator 32 and passed through the highly heated refractory packing material contained therein. At the same time air is introduced into the bottom of regenerator 33 and passed through the heated refractory material therein. The thus heated gases from the top of regenerators 32 and 33 are mixed and a portion of the natural gas is burned by means of the air and serves to raise the temperature of the remaining unburned portion of the natural gas to about 1500° C. At this combustion temperature of about 1500° C. the hydrocarbons are completely decomposed with the production of hydrogen and carbon monoxide, the quantity of air being limited to an amount sufficient to produce a gas product containing about one volume of nitrogen to every three volumes of hydrogen and carbon monoxide. The reaction products from combustion chamber 34 pass through the packing material in regenerator 31 and serve to heat it. When the temperature of regenerators 32 and 33 has fallen to a point at which the hydrocarbon is no longer adequately decomposed by reaction with the steam and oxygen, for example to a temperature at which the combustion temperature of the gases in chamber 34 is below about 1300° C., the introduction of air and natural gas and steam to regenerators 32 and 33 is discontinued and air is again introduced to regenerator 31 and combustible gas to combustion chamber 34 to again heat regenerators 32 and 33 to the desired high temperature.

Provision may be made for passing steam through regenerators 32, 33 and thence through regenerator 31 before reintroducing the air into regenerator 31 and combustible gas into combustion chamber 34 in order to prevent the possibility of explosions occurring at the time of changing the direction of flow of the gases therethrough. Similarly, provision may be made for introducing steam into the bottom of regenerator 31 and passing it through this regenerator and regenerators 32 and 33 after the heating period and prior to a subsequent gas-making period for the same purpose. If desired, the steam and air may be preheated as a mixture of the two in one regenerator and the hydrocarbon gas separately preheated in another regenerator. Furthermore, three regenerators may be employed for the separate preheating of both of the hydrocarbon gas and air and of the steam.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is apparent to one skilled in this art that air enriched with oxygen may be employed for the incomplete combustion of the hydrocarbon gas in place of air. Furthermore, if a gas free from nitrogen is desired, relatively pure oxygen may be employed for this incomplete combustion of the hydrocarbon gas. If desired, regenerators 9 or 31 or combustion chambers 19 or 34 may contain a material adapted to catalyze the reaction between a hydrocarbon and steam.

This application is a division of our copending application Serial No. 484,268, filed September 25, 1930.

We claim:

1. In a process for decomposing hydrocarbons at high temperatures, the steps which comprise passing the hydrocarbons upwardly through an increasingly heated refractory mass, and then passing said gases downwardly through a decreasingly heated refractory mass.

2. A process for producing a nitrogen-hydrogen mixture for ammonia synthesis which comprises passing a mixture of methane and steam upwardly through a reaction zone of gradually increasing temperatures, and then passing same downwardly through a reaction zone of gradually decreasing temperatures while admitting a mixture of oxygen and nitrogen to the gas mixture.

3. A process for producing a mixture of nitrogen and hydrogen suitable for the synthesis of ammonia which comprises passing a gas containing a hydrocarbon and steam upwardly through an increasingly heated refractory mass, and then passing said gas downwardly through a decreasingly heated refractory mass and introducing a mixture of oxygen and nitrogen into said gas at a point prior to the passage of the gas downwardly in contact with the decreasingly heated refractory mass.

4. A process for the reaction of hydrocarbon gases with water vapor to form hydrogen and carbon monoxide at high temperatures, which consists in passing a mixture of hydrocarbon gases and water vapor vertically upward through a zone of increasingly heated refractory material and subsequently vertically downward through a zone of decreasingly heated refractory material and burning gas in the circuit between the points of maximum temperature of the two refractory masses.

5. A process for decomposing hydrocarbons at high temperatures which comprises preheating and partially decomposing the hydrocarbons while passing upwardly through a heated refractory mass, then completing the decomposition by passing the same in the same vertical direction in contact with more highly heated refractory material, and recovering the sensible heat of the decomposed mixture by passing the latter downwardly through a relatively colder refractory mass.

6. A process for decomposing hydrocarbons at high temperatures which comprises preheating and partially decomposing the hydrocarbons while passing upwardly through a heated refractory mass, then completing the decomposition by passing the same in the same vertical direction in contact with more highly heated refractory material, while adding a mixture of oxygen and nitrogen to the gases during their decomposition, sufficient in amount to maintain substantially constant temperatures in the more highly heated reaction zone, and recovering the sensible heat of the decomposed mixture by passing the latter downwardly through a relatively colder refractory mass.

7. A process for the reaction of hydrocarbon gases with water vapor to form hydrogen and carbon monoxide at high temperatures in the presence of a refractory mass, characterized by the fact that the gases are first preheated and partially react while passing vertically upward through a zone of increasing temperature and further react while passing vertically downward through a zone of decreasing temperature, and further characterized by the fact that the heating is accomplished in a region in the gas circuit between the top of the zone where at one time the reacting gases have had ascending temperatures in their upward travel, and the top of the zone where the reacting gases have had descending temperatures in their downward travel.

8. A process for decomposing hydrocarbons at high temperatures which comprises preheating and partially decomposing the hydrocarbons while passing upwardly through a heated refractory mass, then completing the decomposition by passing the same in the same vertical direction in contact with more highly heated refractory material, while adding a mixture of oxygen and nitrogen to the gases during their decomposition, and recovering the sensible heat of the decomposed mixture by passing the latter downwardly through a relatively colder refractory mass.

DWIGHT C. BARDWELL.
FRANK PORTER.